Figure 1:
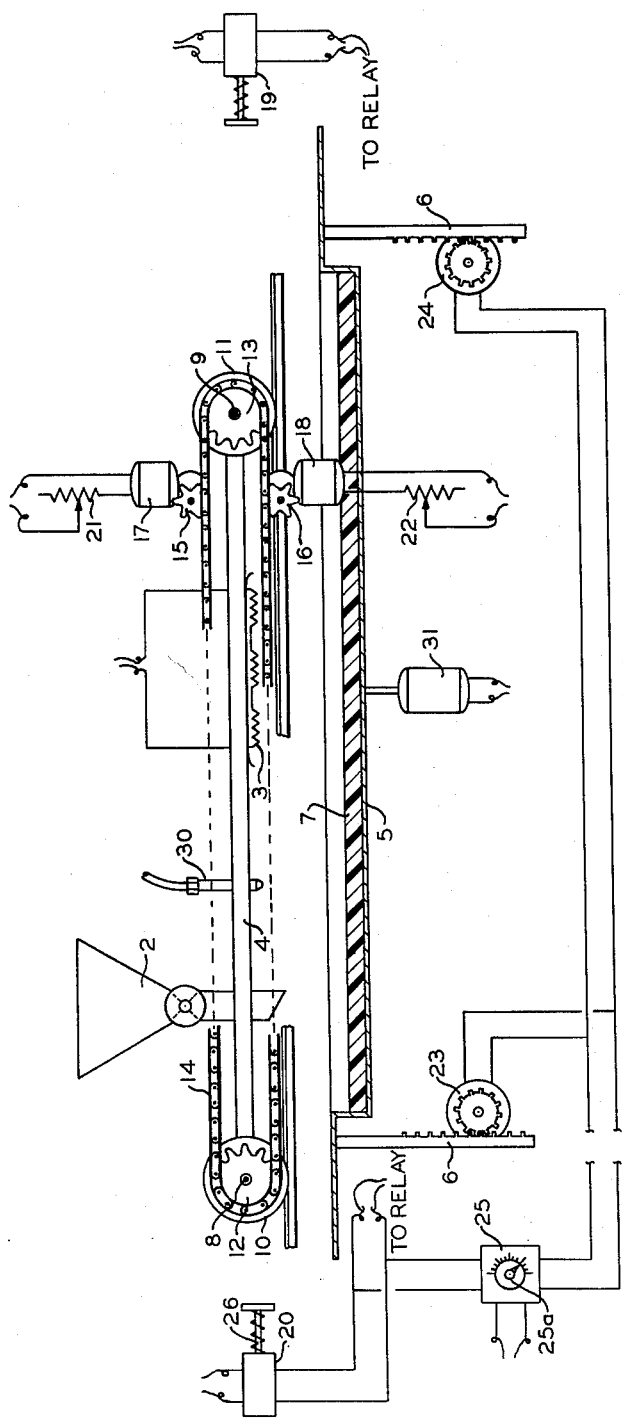

Feb. 2, 1965  C. L. SEEFLUTH  3,168,603
METHOD AND APPARATUS FOR PREPARING SHEETS OF THERMORESPONSIVE
PLASTIC PARTICULATE MATERIAL
Filed Oct. 2, 1961

INVENTOR.
C. L. SEEFLUTH
BY
*Young & Quigg*
ATTORNEYS

United States Patent Office 3,168,603
Patented Feb. 2, 1965

3,168,603
METHOD AND APPARATUS FOR PREPARING SHEETS OF THERMORESPONSIVE PLASTIC PARTICULATE MATERIAL
Charles L. Seefluth, Bartlesville, Okla., assignor to Phillips Petroleum Company, a corporation of Delaware
Filed Oct. 2, 1961, Ser. No. 142,410
19 Claims. (Cl. 264—69)

This invention relates to the preparation of sheets of thermoresponsive plastic material. In one of its aspects, the invention relates to a method of forming a sheet from thermoresponsive plastic particulate material by laying down a thin layer thereof, heating the layer to cause the particles to fuse and to solidify together and then repeating the operation until a desired thickness of plastic material or a sheet has been obtained. In another of its aspects, the invention relates to an apparatus comprising in combination means to produce layers of thermoresponsive plastic particulate material, means to heat each of said layers, and means to maintain the distance between the means to heat and the top of the last-laid layers substantially constant. In another of its aspects, the method involves, and the apparatus comprises, a step and means, respectively, for blowing the layer of particles to adjust the same to cause, for example, a pile of particles to break so that excess particles at one point are pushed into cavities which may exist around that point. In a further aspect, the invention relates to a method comprising a step and to an apparatus comprising a means for vibrating the layered particulate mass prior to heating the same to cause the same to fuse and to solidify to form said sheet. In a particular aspect of the invention, it relates to the apparatus of a specific form and characteristics as set forth herein. In a still further aspect of the invention, the heating of the particulate mass to cause the same to fuse together is accomplished by radiant heat. In a further aspect still of the invention, the heating to accomplish the coalescence of the particles is accomplished by blowing the same with a hot gaseous medium at a temperature and for a time sufficient to cause said coalescence.

It has now been conceived that homogeneous structures of densities of from approximately one-half to approximately unity can be prepared from plastic particles by passing a bed in successive cycles under a radiant heat source and, at each cycle, depositing monogranular layers of particulate plastic or polymer. The homogeneous structures which have been made have a homogeneity variation of less than approximately 5 percent. The smaller the particle, the denser the product. A density of approximately .66 has been achieved with 20–50 mesh Marlex (a trademark for Phillips' family of olefin polymers) polyethylene. This material was subjected to a radiant heat source of approximately 940–975° F. providing peak energy in the 3–3.5 micron wave length which is particularly absorptive by the Marlex polyethylene which was used.

It has also been conceived that fusion heat can be imparted to each granule in the bed by heat imparted to the bed or to the support therefor by passing hot air across the bed in successive cycles intermediate which sprinkling of the granulated polymer is practiced. The air movement blows away the excess granules and also tends to fill cavities rather than build on the highest, hottest asperities. Thus, uniform thickness can be maintained. The width and length of the bed can be varied. Time of heating, length of the bed passing under the heating means, or time during which blowing is practiced with a hot gaseous medium such as air, melting point, and degree of fusion required are factors which are considered in the practice of the invention.

The plastic material can be fused solid or in fractional densities as low as about .3 by suitable choice of granule size and temperature. The method is much faster than heating a mass of polymer through the depth of polymer.

It is an object of this invention to build a sheet or block from a subdivided or particulate thermoresponsive material such as a polyolefin, resin, or plastic. It is another object of the invention to provide an apparatus for preparing a sheet or block or slab of a plastic material from a particulate mass of thermoresponsive material or plastic. It is a further object of the invention to provide sheets or slabs or blocks of thermoresponsive material, the said sheets, blocks or slabs having varying densities and porosities.

Other aspects, objects and the several advantages of the invention are apparent from a study of this disclosure and the appended claims.

According to this invention, there is provided a method for forming a sheet of thermoresponsive plastic particulate material which comprises laying down said material in successive layers and, after the laying of each layer, subjecting the just laid-down layer to action of heat to cause the plastic particles to fuse and to solidify with each other and the earlier-laid particles.

Also, according to the present invention, it is within its scope to only partially fuse the particles, that is, on their surfaces, to cause them to coalesce without, however, completely condensing the mass with resulting elimination of all porosity. Thus, according to the present invention, a flexibility of operation is possible which permits the creation of varying densities or porosities within the sheet, slab or block produced.

Also, according to the present invention, apparatus for execution of the method of the invention has been conceived and devised, the apparatus comprising, in combination, means for spreading thermoresponsive particulate material, as a sheet, and means to heat the spread thermoresponsive material.

In various embodiments or modifications of the invention, certain advantageous features are involved, as is apparent from a study of this disclosure, the drawing and the appended claims. These features are here omitted, for sake of brevity, it being understood that the claims include within their scope any and all features or combinations thereof, as set forth in this disclosure, drawing and the claims.

Figure 2:
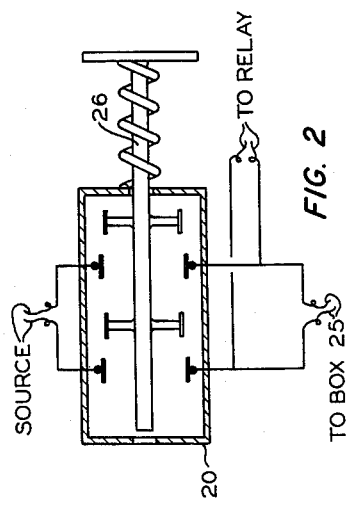

In the drawing, FIGURE 1 is a diagrammatic showing of the overall form of an embodiment of the invention. FIGURE 2 is a diagrammatic showing of the inside of box 20 of FIGURE 1 showing how there is made a combination of a limit switch and a switch to energize a timer, 25, in FIGURE 1.

Referring now to FIGURE 1, the machine consists of a hopper-feeder 2 and radiant heater 3 mounted on a carriage 4 which passes back and forth over a forming bed 5 which has means 6 for being lowered periodically to maintain uniform distance between bed surface 7 and heater 3. The reciprocating mechanism for the carriage consists of two axles 8 and 9, with two pair of freely rotating tracked wheels 10 and 11. Sprockets 12 and 13 are mounted, respectively, on axles 8 and 9 on the same side of the carriage and connected by an endless chain 14. The two lengths of chain between axles are independently engaged by motor driven sprockets 15 and 16 driven by motors 17 and 18, respectively. Motor 17 drives slowly, all the time driving the carriage to the right until limit switch 19 through a self-energized relay (not shown) turns on motor 18 which operates at a higher speed, driving its side of the chain faster than the constantly driven side thus reversing the direction of travel of the carriage until a limit switch 20 operating through the aforementioned relay turns off motor 18 when motor 17 again governs the direction of travel. Speed in each direction can be varied by powerstat operated series wound motor rheostats 21 and 22, respectively, indicating control of the motors' speeds. Thus, the ratio of heat input to weight of material fed per cycle can be varied.

The bed 5 is lowered after each pass of the heater 3 by means of periodically operated motors 23 and 24 which are geared to shaft 6 and which are arranged to be energized by the mechanism of switch 20 by way of control box 25. Thus, switch 20 provides power to box 25 which regulates the current flowing to motors 23 and 24. In box 25, there is provided a solenoid-operated timer switch which can be adjusted to feed current to motors 23 and 24 for various lengths of time, as desired, to adjustably set the travel of the tray or bed 5 at each pass of the heater 3.

In a modification of an embodiment of the present invention, hopper 2 can be placed upon a shaft 8 or upon shaft 9 and a screw or other feed or mechanism can be adapted to the hopper to feed plastic particles into bed 5 either when the hopper travels in one direction or when it travels in both directions, as will be understood by a mechanic skilled in the art and having studied this disclosure, for example, a ratchet mechanism will ensure operation of the feeder screw upon travel of the hopper in only one direction.

In a further modification of the invention, the gaseous medium which can be air is blown across the surface of the freshly laid-down particles of plastic as by blowing means 30. This results in blowing away particles which may be in excess and on top of particles which have fused to the hot bed. Thus, it is possible to operate by laying down on the heated bed a layer of particles, only some of which fuse by contact heat transfer and to blow away excess particles before laying down additional particles and/or passing the heat source of additional heat to the bed. It will be noted expressly that the step of blowing fills in cavities and, therefore, constitutes an important feature of the invention. By blowing after heating the last layer, it is possible to cool temporarily the mass of particles to avoid shrinkage voids when this is desired. Thus, blowing can be practiced either before and/or after laying down a layer of particles. More than one blowing can be provided. Blowing media of different kinds employed at different velocities or at different amounts or temperatures can be provided. Thus, adjustment of the layer can be made with one stream of gas or air and cooling or heating can be effected with another. Thus, in a still further embodiment of the invention, all or some of the heating of the layered particles can be accomplished by a stream of hot gaseous medium introduced at 30 or at an equivalent place. Combinations of hot and cooler medium can be used, either simultaneously or successively to accomplish desired results set forth herein. As a variant, the adjustment of the particles can be made by other means or steps as by vibrating the layer mechanically as by a vibrator 31. Or, a combination of the blowing and vibration can be practiced.

Still further, it is possible to build a layered construction in which, alternately, particles of a certain size are laid upon particles of a different size by utilization of two hoppers. Using a plurality of hoppers which can be rendered active alternately or in any sequence desired, various desired structures can be accomplished.

It will be observed that the layering method of heating of the invention provides a step to heat a material of low conductivity while this same layering method step provides cooling to prevent shrinkage voids.

In a further modification, it is possible to provide means to shut off the heating means during a portion of the cycle as when it is found that it is helpful to avoid too much heating of the layer as by heating with full effect on both sweeps or passages of the heater over the layer.

As one means and method of controlling the amount of heat passing to the layered particles, it is possible to analyze light reflected from the surface heated and to use the energy of this light to control the current to the heater since, as the particles change shape and surface characteristics by heat absorption, the reflected light will vary. As a further modification, the speed of movement of the heater across the layered particles can be controlled responsive to said reflected light.

It will be understood that while the apparatus set forth herein is well suited to the operation herein described, which it has performed, the plastic sheets can be formed by other means and, indeed, in a less practical manner by hand application of successive layers of particles and hand-heating of them at the required and desired distance, as set forth herein.

Although there is shown but one hopper and one heating means, it is clear, as indicated herein, that one skilled in the art, having studied this disclosure, can adapt more than one hopper and more than one heater for more rapid operations. It is within the scope of the invention to utilize a hopper feeding continuously and followed by a heater on both ends so that continuous lay-down of particles and heating thereof can be practiced, or, two or more hoppers with an interposed heater can be used. Presently, the illustrated single hopper and single heater are preferred for the reason that the arrangement blends itself nicely to construction operation with only control of one hopper and heater being necessary.

Further, it will be apparent to one skilled in the art having studied this disclosure that he can replace the now-preferred automatic lowering mechanism, which can be made to operate as a raising mechanism by polarity reversal, with a hand-operated means. Or, the plastic, when it is floatable, as in the case of polyethylene, can be layered onto water in a trough and water removed from the trough at desired time intervals, coordinated with the cycle of operation, as desired.

Still further, while several motors have been shown, it is possible to provide, say, a single power source and to mechanically or otherwise accomplish the variation of position of the elements of the embodiment of the invention.

*Example I*

Using XPF 60–52 polymer ground and sifted to 20–50 mesh, an 18″ x 24″ slab was made 1″ thick of .95 specific gravity. The carriage moved at 50 inches/minute for the feed run and 5 inches/minute for the heating run.

XPF 60–52 homopolymer 1.87 HIMI, .955 density, 3.27 inherent viscosity.

*Example II*

Using XPF 60–15 polymer ground and sifted to 20–50 mesh, an 18″ x 24″ slab was made 1″ thick of .67 specific gravity. The carriage moved at 75 inches/minute for the feed run and 7.5 inches/minute for the heating run.

XPF 60–15 homopolymer 1.00 HIMI, .954 density, .394 inherent viscosity.

*Example III*

Using XPF 60–15 polymer ground and sifted to 20–50 mesh and tumbled with ½ percent of carbon black, an 18″ x 24″ slab was made 1¾″ thick in 75 minutes using a 375 inch/minute feed run and a 33 inch/minute heating run. Specific gravity was .75. The black eliminated the tendency of the slab to warp and prevented formation of hot spots resulting in very uniform density.

*Example IV*

Using XPF 60–15 polymer ground and sifted to 20–50 mesh and tumbled with ½ percent No. 59–6200 blue pigment, a 12″ x 24″ slab was made 3⅛″ thick in 140 minutes having a specific gravity of .93. A speed of 750 inches—minute was used on the feed run and 75 inches/minute on the heating run. The blug pigment eliminated hot spots but some warping occurred.

The heater actually used in the examples is a Chromalox infrared radiant heater no. RADD-3224 with two parallel elements 23" long totalling 2200 watts and having a surface temperature of about 1600° F. which is held within 2 to 3 inches of the bed or cake surface.

In general, any particulate material of a thermoresponsive nature can be used within the scope of this invention. The XPF polymer used in the examples was produced by the method that is fully described in a copending application of G. T. Leatherman et al., Serial No. 590,567, filed June 11, 1956.

The Leatherman et al. process comprises contacting ethylene or mixtures of ethylene with other unsaturated hydrocarbons with a suspension of chromium oxide-containing catalyst in a liquid hydrocarbon diluent, the contacting occurring at a temperature such that substantially all of the polymer produced is insoluble in the diluent and is in solid particle form, the particles being substantially non-tacky and non-agglutinative in the liquid diluent.

Density of the polymer as used herein is determined by placing a pea-sized specimen cut from a compression molded slab of the polymer in a 50-ml., glass-stoppered graduate. Carbon tetrachloride and methyl cyclohexane are added to the graduate from burettes in proportion such that the specimen is suspended in the solution. During the addition of the liquids the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range of 73–78° F. the balance is adjusted until the pointer is at zero. With the balance set to read 1.000 with a sample of distilled water at 4° C., the specific gravity will be numerically equal to density in grams per cc. The value shown on the scale is taken as the specific gravity.

For melt index, the method of ASTM D–1238–52T is used with five runs being run at 2-minute intervals, averaging the five weights, discarding any values which deviate from the average by more than 5 weight percent, reaveraging and multiplying by 5 to obtain the amount of extrudate in 10 minutes. If the melt index is low, such as less than 1.0, the High Load Melt Index may be obtained by ASTM D–1238–57T (procedure 5) using a weight of 21,600 grams.

Inherent viscosity is determined by measuring the time required for a filtered solution of 0.1000 gram of the polymer in 50 ml. of tetralin (measured at 75° F.) to run through the marked length on a size 50 (0.8 to 3.0 centistokes) Ostwalk-Fenske viscosimeter at a temperature of 130° C., the viscosimeter being immersed in a thermostatically controlled oil bath, and measuring also the time required for an equal volume of tetralin containing no polymer to run through the same distance on the same viscosimeter. The inherent viscosity is calculated by the following formula:

$$r = \frac{\log V_r}{C}$$

wherein $C = 0.183$ and $V_r =$ time in seconds required for solution to run through viscosimeter divided by the corresponding time required for the polymer-free tetralin, both at 130° C.

Reasonable variation and modification are possible within the scope of the foregoing disclosure, the drawing and the appended claims to the invention, the essence of which is that a thermoresponsive plastic particulate material has been layered and heated to form a sheet, slab or block as set forth and described herein and further, that apparatus or means have been provided to automatically accomplish the formation of such a sheet, slab or block; also, various method and means for adjusting the particulate material, heating and/or cooling the same, etc. have been set forth and described.

I claim:

1. A method for forming a sheet of thermoresponsive plastic particulate material which comprises laying down a plurality of substantially monogranular layers of said material in successive layers and after the laying of each layer, passing a source of heat over the just-laid-down layer to cause the plastic particles to fuse and to solidify with each other and the earlier-laid particles.

2. A method according to claim 1 wherein the top of the sheet of plastic material as it is being formed is kept at a substantially constant distance from the heat source, thereby allowing for the building-up of the thickness of the sheet.

3. A method according to claim 1 wherein the particulate material is subjected to a blowing to cause piled particulate material to move into cavities prior to the heating, said cavities representing low spots in a just-laid-down layer.

4. A method according to claim 2 wherein the particulate material is subjected to vibration to cause uniform leveling of the material prior to heating the same.

5. A method according to claim 1 wherein the just-laid-down layer is heated by blowing the same with a gaseous medium at a temperature sufficient to cause the fusion and solidification of the particles, each with the other.

6. An apparatus comprising holding means for holding a layer of thermoresponsive plastic particles; feeding means for feeding said plastic particles onto said holding means; reciprocable displacement means for repeatedly displacing said feeding means and said holding means with respect to each other to lay down successive layers of plastic particles onto said holding means while feeding said plastic particles thereonto; heating means to coact with said holding means to heat each layer of laid-down particles in said holding means to fuse said particles together at their points of mutual contact and spacing means to maintain the distance between said heating means and the last laid-down layer of particles constant.

7. An apparatus comprising holding means for holding a layer of thermoresponsive plastic particles; feeding means for feeding said plastic particles onto said holding means; reciprocable displacement means for repeatedly displacing said feeding means and said holding means with respect to each other to lay down successive layers of plastic particles onto said holding means while feeding said plastic particles thereonto; blowing means actuatable to blow a gaseous medium onto a layer of particles, when it has been laid; heating means to coact with said holding means to heat each layer of laid-down particles in said holding means to fuse said particles together at their points of mutual contact, and spacing means to maintain the distance between said heating means and the last laid-down layer of particles constant.

8. An apparatus comprising holding means for holding a layer of thermoresponsive plastic particles; feeding means for feeding said plastic particles onto said holding means; reciprocable displacement means for repeatedly displacing said feeding means and said holding means with respect to each other to lay down successive layers of plastic particles onto said holding means while feeding said plastic particles thereonto; blowing means actuatable to blow a gaseous medium onto a layer of particles, when it has been heated by the heating means set forth in this claim; heating means to coact with said holding means to heat each layer of laid-down particles in said holding means to fuse said particles together at their points of mutual contact, and spacing means to maintain the distance between said heating means and the last laid-down layer of particles constant.

9. An apparatus comprising holding means for holding a layer of thermoresponsive plastic particles; feeding means for feeding said plastic particles onto said holding means; reciprocable displacement means for repeatedly displacing said feeding means and said holding means with respect to each other to lay down successive layers of plastic particles onto said holding means while feeding said plastic particles thereonto; vibration means to vibrate a layer of particles to uniformly level the same; heating means to coact with said holding means to heat each layer of laid-down particles in said holding means to fuse said particles together at their points of mutual contact, and spacing means to maintain the distance between said heating means and the last laid-down layer of particles constant.

10. An apparatus comprising a plate adapted to support a layer of thermoresponsive particles; holding means for holding said plate when it is supporting a layer of thermoresponsive plastic particles, said holding means being adapted to be moved upwardly and downwardly while being maintained in an essentially horizontal attitude; feeding means for feeding said plastic particles onto said plate; reciprocable displacement means for repeatedly displacing said feeding means and said holding means, containing said plate, with respect to each other to lay down successive layers of plastic particles onto said plate while feeding said plastic particles thereonto; heating means to coact with said holding means to heat each layer of laid-down particles on said plate to fuse said particles together at their points of mutual contact, and spacing means to maintain the distance between said heating means and the last laid-down layer of particles constant, said spacing means being adapted to move said holding means containing said plate, downwardly from said heating means as each layer of particles has been laid.

11. An apparatus for making a sheet of plastic from thermoresponsive plastic particles which comprises an assembly having a frame, said frame supporting a hopper and a heater, said frame being supported by wheels at its sides, a rail member at each side of said frame, said wheels respectively resting on said rails so that the rails carry said frame so that the whole assembly is adapted for reciprocating motion on said rails as a vehicle, a sprocket attached to each of two of said wheels on one side of said vehicle, an endless chain supported on said sprockets, first means for driving a segment of said chain between said sprockets and located to one side of a line drawn between their shafts in a sense at a determined speed, causing said vehicle to move in one direction on said rails, second means for driving the remaining segment of said chain to the other side of said line in opposite sense at a greater speed to cause said vehicle to move in opposite sense on said rail; means to control said second means to render it operative periodically; and means below said vehicle to support plastic discharged from said hopper as said vehicle moves along said rails.

12. An apparatus according to claim 11 wherein means are provided to adjust the position of said means to support said plastic relative to the heater so as to maintain a desired distance between the top layer of plastic and said heater.

13. An apparatus according to claim 12 wherein blowing means adapted to blow across the last layer of plastic are provided to aid in smoothing said layer.

14. An apparatus for building a sheet from thermoresponsive plastic particulate material which comprises a support, reciprocable means for laying down successive substantially monogranular layers of plastic particulate material onto said support and heating means for heating each layer before the next layer is laid thereon.

15. An apparatus according to claim 14 wherein the means for heating is adapted to heat the particulate material by blowing hot air thereon.

16. An apparatus for producing a sheet of plastic from thermoresponsive plastic particulate material which comprises spreading means for spreading successive layers of particulate material onto a surface, heating means for heating each said layer of particulate material, and spacing means for maintaining the distance between the top of the last-laid layer and the heating means substantially constant.

17. An apparatus for producing a sheet of plastic from thermoresponsive plastic particulate material which comprises means for spreading successive layers of particulate material onto a surface, blowing means for blowing each said layer of particulate material to level the said layer, heating means for heating and fusing each said layer of particulate material, and spacing means for maintaining the distance between the top of the last-laid layer and the said heating means substantially constant.

18. An apparatus for producing a sheet of plastic from thermoresponsive plastic particulate material which comprises means for spreading successive layers of particulate material onto a surface, means for vibrating said particulate material to level each layer as it is laid down, heating means for heating and fusing each said layer of particulate material, and means for maintaining the distance between the top of the last-laid layer and the heating means substantially constant.

19. An apparatus for producing a sheet of plastic from thermoresponsive plastic particulate material which comprises spreading means for spreading a layer of particulate material onto a supporting surface, unidirectional heating means for heating said layer of particulate material to fuse said particles together and reciprocable displacement means for repeatedly displacing the said heating means and the said supporting surface with respect to each other.

References Cited in the file of this patent

UNITED STATES PATENTS

| | | |
|---|---|---|
| 919,341 | Frenkel | Apr. 27, 1909 |
| 1,930,327 | Thomson | Oct. 10, 1933 |
| 2,036,367 | Shinn et al. | Apr. 7, 1936 |
| 2,200,155 | Camp et al. | May 7, 1940 |
| 2,297,248 | Rudolph | Sept. 29, 1942 |
| 2,605,506 | Miller | Aug. 5, 1952 |
| 2,696,330 | Fahrni | Dec. 7, 1954 |
| 2,736,925 | Heisler et al. | Mar. 6, 1956 |
| 2,770,556 | Grangaard et al. | Nov. 13, 1956 |
| 2,915,788 | Engel | Dec. 8, 1959 |
| 2,960,727 | Bradshaw et al. | Nov. 22, 1960 |

FOREIGN PATENTS

| | | |
|---|---|---|
| 917,813 | France | Jan. 22, 1947 |
| 1,272,579 | France | Aug. 21, 1961 |